(12) United States Patent
Rai et al.

(10) Patent No.: US 8,169,856 B2
(45) Date of Patent: May 1, 2012

(54) TIME SYNCHRONIZATION IN CLUSTER SYSTEMS

(75) Inventors: Vikram Rai, Franklin Park, NJ (US);
Alok Srivastava, Newark, CA (US);
Angelo Pruscino, Los Altos, CA (US);
Sameer Joshi, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 790 days.

(21) Appl. No.: 12/258,344

(22) Filed: Oct. 24, 2008

(65) Prior Publication Data

US 2010/0103781 A1 Apr. 29, 2010

(51) Int. Cl.
*G04C 13/00* (2006.01)
*G04C 11/02* (2006.01)
*H04L 7/00* (2006.01)
*G06F 15/16* (2006.01)

(52) U.S. Cl. ............ 368/46; 368/47; 375/354; 709/248

(58) Field of Classification Search .................... 368/46, 368/47; 370/350, 503, 509; 375/354, 356; 709/248
See application file for complete search history.

(56) References Cited

U.S. PATENT DOCUMENTS

| | | | |
|---|---|---|---|
| 4,368,987 A * | 1/1983 | Waters | 368/46 |
| 4,607,257 A * | 8/1986 | Noguchi | 340/12.22 |
| 5,546,558 A | 8/1996 | Jacobson et al. | |
| 5,680,570 A | 10/1997 | Rantala et al. | |
| 5,724,581 A | 3/1998 | Kozakura | |
| 5,787,445 A | 7/1998 | Daberko | |
| 5,845,313 A | 12/1998 | Estakhri et al. | |
| 5,940,850 A | 8/1999 | Harish et al. | |
| 6,148,377 A | 11/2000 | Carter et al. | |
| 6,347,084 B1 * | 2/2002 | Hulyalkar et al. | 370/347 |
| 6,351,821 B1 | 2/2002 | Voth | |
| 6,665,316 B1 * | 12/2003 | Eidson | 370/509 |
| 7,120,092 B2 * | 10/2006 | del Prado Pavon et al. | 368/46 |
| 7,240,065 B2 | 7/2007 | Yang et al. | |
| 7,251,660 B2 | 7/2007 | Yang et al. | |
| 7,327,699 B1 * | 2/2008 | Schafer | 370/324 |
| 2003/0152110 A1 | 8/2003 | Rune | |
| 2005/0033862 A1 * | 2/2005 | Blum et al. | 709/248 |
| 2005/0071703 A1 * | 3/2005 | Lee et al. | 713/400 |
| 2005/0144199 A2 | 6/2005 | Hayden | |
| 2005/0237926 A1 | 10/2005 | Cheng et al. | |
| 2005/0256897 A1 | 11/2005 | Sinha et al. | |
| 2005/0278350 A1 | 12/2005 | Yang et al. | |
| 2006/0095591 A1 | 5/2006 | Kelly | |
| 2007/0008993 A1 * | 1/2007 | Cha et al. | 370/509 |
| 2008/0183894 A1 | 7/2008 | Rai et al. | |

\* cited by examiner

*Primary Examiner* — Vit Miska
(74) *Attorney, Agent, or Firm* — Hickman Palermo Truong & Becker LLP; Christian A. Nicholes (57) ABSTRACT

Techniques are described herein for synchronizing cluster time. According to one technique, a master node is appointed in a cluster. Other "slave" nodes periodically synchronize their clocks with the master node. To synchronize its clock with the master node, a slave node sends a timestamped message to the master node, which also timestamps the message and sends the message back to the slave node, which then timestamps the message again. Based on the timestamps, the slave node is able to determine the difference between the master node's clock's time and slave node's clock's time, compensating for the message travel time between master node and slave node. Depending on various circumstances, and based on the determined difference, the slave node adjusts its clock so that the time indicated by the slave node's clock at least begins to approach more closely the time indicated by the master node's clock.

26 Claims, 3 Drawing Sheets

TIME SYNCHRONIZATION IN CLUSTER SYSTEMS

CROSS-REFERENCE TO RELATED APPLICATIONS

The present application is related to U.S. patent application Ser. No. 11/698,605, which is titled "SYNCHRONIZING CLUSTER TIME," and which was filed on Jan. 25, 2007, and which is incorporated by reference in its entirety for all purposes as though fully disclosed herein.

FIELD OF THE INVENTION

The present invention relates generally to cluster systems and, more specifically, to techniques for keeping nodes in a cluster system sufficiently synchronized with some authoritative time reference.

A "cluster" is the result of "clustering" computing resources together in such a way that they behave like a single resource. Clustering is often used for purposes of parallel processing, load balancing and fault tolerance. One common example of a cluster is a set of computers, or "nodes," that are configured so that they behave like a single computer. Each computer in the cluster has shared access to a set of resources. A resource is, generally, any item that can be shared by the computers in the cluster. A common example of a resource is a block of memory in which information is stored. The block of memory may be part of a node in the cluster or may be external to the cluster, such as a database block.

A cluster comprises multiple nodes, each of which each executes an instance of a server that each facilitates access to a shared set of resources on behalf of clients of the cluster. One example of a cluster is a database cluster. A database cluster comprises multiple nodes, each of which executes an instance of a database server that each facilitates access to a shared database. Among other functions of database management, a database server governs and facilitates access to the particular database by processing requests by clients to access data in the database. It is essential that each of the nodes in a database cluster is sufficiently synchronized according to some authoritative time reference. If the nodes are not sufficiently synchronized, then various maladies can plague the database system. The clocks of the various nodes of the database cluster need to be synchronized in order to ensure log file accuracy, for accurate data auditing and monitoring, for network fault diagnosis and recovery, and in order to ensure the correctness of file time stamps. Time synchronization also can be used in the context of directory services, access security and authentication, distributed computing, scheduled operations, and real-world time values.

According to one synchronization approach, one of the nodes in the database cluster is appointed to be the "master node." The master node is deemed to be the authoritative time reference for the other nodes in the cluster. There are various ways in which the master node may be selected. For example, when a node first comes online, the node may attempt to obtain a lock on a particular resource, and, if the node succeeds, then the node may appoint itself to be the master node. Subsequent nodes which are unable to obtain the lock (because the lock is already held by the master node) will thereby discover that a master node has already been appointed. After a master node has been appointed, the master node may inform the other nodes in the cluster (e.g., via broadcast messages) that the master node is the master node.

However, once the master node has been appointed, the other nodes require some way of reliably synchronizing their clocks with the master node's clock.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques for synchronizing the clocks of nodes in a cluster are disclosed herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Embodiments of the invention discussed herein relate to synchronizing cluster time. According to one embodiment of the invention, a master node is appointed from among a plurality of nodes in a cluster. The other nodes ("slave nodes") periodically synchronize their clocks with the master node. In order to synchronize its clock with that of the master node, a slave node sends a timestamped message to the master node, which also timestamps the message and sends the message back to the slave, which then timestamps the message again. Based on the timestamps indicated in the message, the slave is able to determine the difference between the time indicated by the master node's clock and time indicated by the slave node's clock, compensating for the amount of time that it took for the message to travel between the master node and the slave node. Depending on various circumstances, and based on the determined difference, the slave node adjusts its clock so that the time indicated by the slave node's clock at least begins to approach more closely the time indicated by the master node's clock.

Example Cluster

Figure 1:
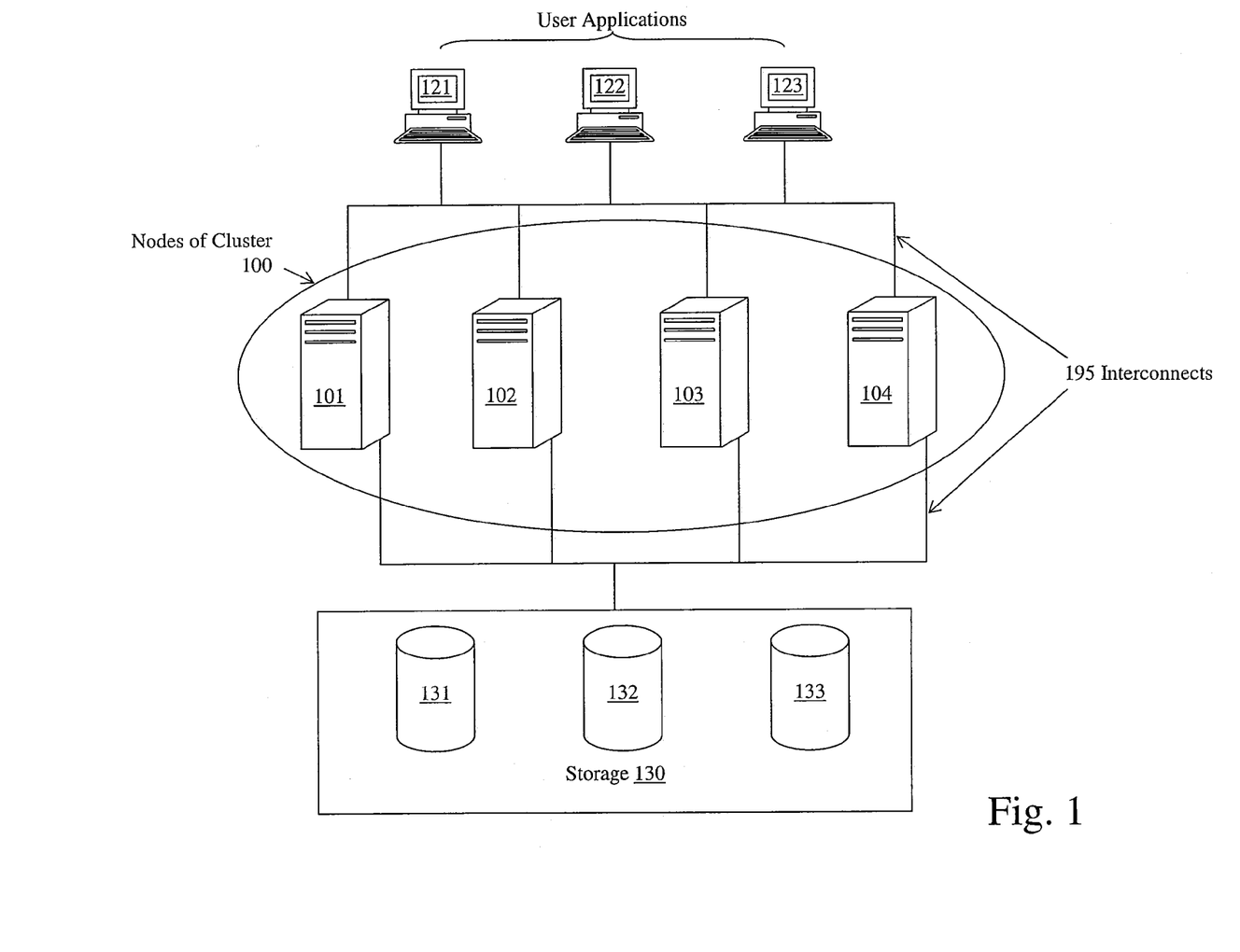
FIG. 1 depicts an example computing cluster, according to an embodiment of the invention.

FIG. 1 depicts an example computing cluster 100, according to an embodiment of the invention. Cluster 100 comprises computers 101-104, which are interconnected to form a system for supporting multiple distributed applications 121-123. One of the computers of cluster 100 functions as a master node. The other computers of cluster 100 function as slave nodes. While any one of the computers 101-104 can function as a master node of cluster 100, only one of them may be the master node at a given time. The master node acquires and holds control over a distributed lock service in cluster 100, which synchronizes access to shared resources between the nodes.

Each of nodes 101-104 has a clock. Each node's clock keeps track of a local time associated with that node. Such a clock may be implemented in the hardware of each computer. For example, an electronic oscillator may be used to implement the clock. The clock associated with the master node functions as a master clock for cluster 100.

Computers 101-104 are networked with interconnects 195, which can comprise a hub and switching fabric; a network, which can include one or more of a local area network (LAN), a wide area network (WAN); an internetwork (which can include the Internet); and wire line based and/or wireless transmission media.

While four computers are shown in the example depicted in FIG. 1, it should be appreciated that virtually any number of computers can be interconnected as nodes of cluster 100. The four example computers shown are depicted by way of illustration, description and simplification and in no way by limitation.

Computers 101-104 may be configured as clustered database servers. When so configured, cluster 100 functions as a real application cluster (RAC), such as are available commercially from Oracle Corporation. Such RAC clustered database servers can implement a foundation for enterprise grid computing and/or other solutions capable of high availability, reliability, flexibility and/or scalability. Additional information about RAC can be found in Gopalakrishnan, K., "*Oracle Database* 10 *g Real Application Clusters Handbook*," which is incorporated by reference in its entirety for all purposes as though fully disclosed herein.

Cluster 100 interconnects the distributed applications 121-123 to information storage 130, which includes volumes 131-133. Storage 130 can include any number of volumes. Storage 130 can be implemented as one or more hard disk drives, for example. In one embodiment of the invention, storage 130 contains the data of the database on which multiple concurrently executing database server instances, distributed among computers 101-104, operate.

Synchronizing a Slave Node's Clock with a Master Node's Clock

Figure 2:
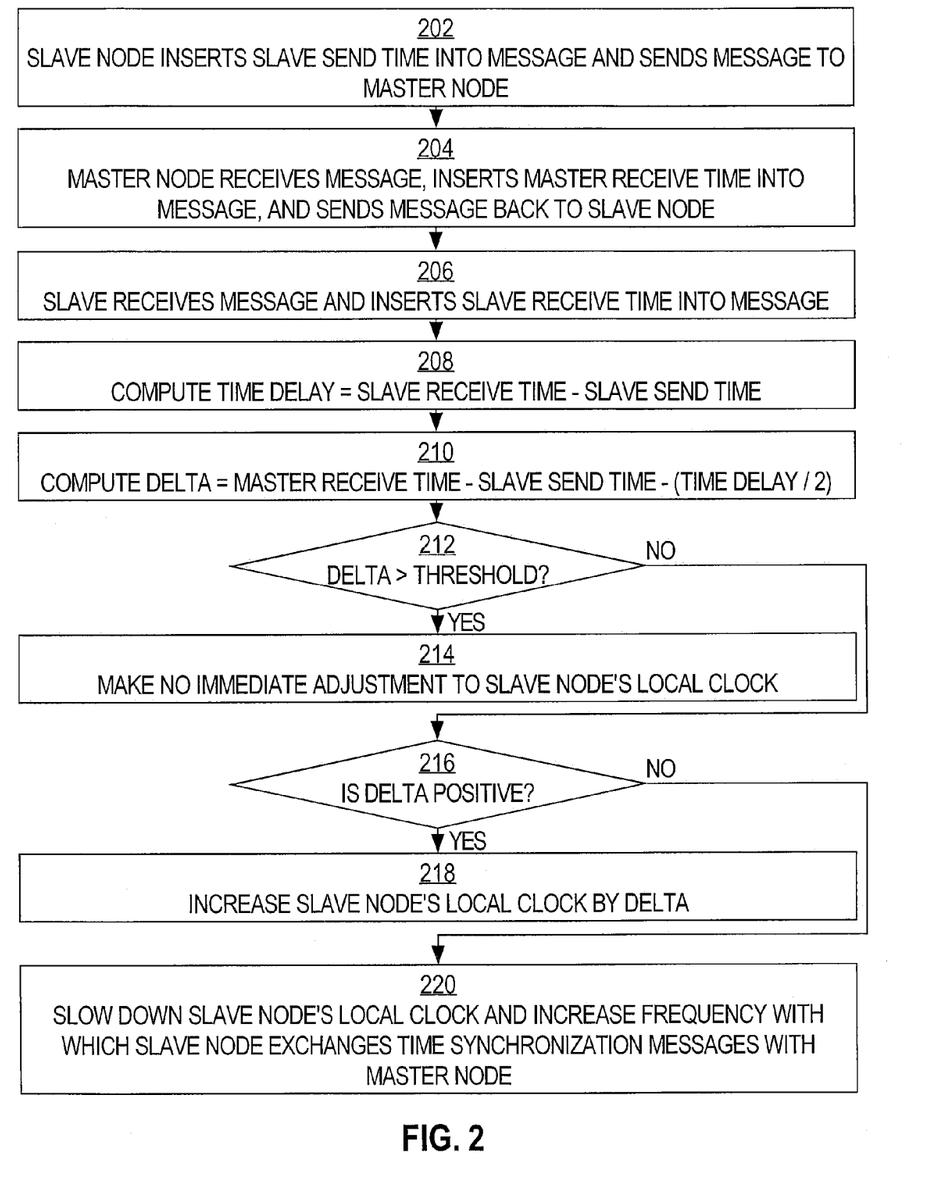
FIG. 2 depicts an example technique for synchronizing cluster time, according to an embodiment of the invention.

FIG. 2 depicts an example technique for synchronizing cluster time, according to an embodiment of the invention. According to one embodiment of the invention, the technique discussed in FIG. 2 is performed in a cluster that includes a fast messaging system that allows a node to communicate quickly and effectively with another node for time synchronization purposes. The technique discussed in FIG. 2 may be performed by various ones of computers 101-104 periodically.

The technique discussed in FIG. 2 begins at some instant after a master node has been appointed for the cluster (e.g., through a lock acquisition process). In block 202, a slave node creates a message, inserts a first timestamp (called "slave send time") into the message, and sends the message toward the master node. The first timestamp specifies the time that is currently indicated by the local clock of the slave node at the moment that the slave node sends the message toward the master node. For example, if computer 101 is the master node, then computer 102 (a slave node) may generate and send such a message over interconnects 195 toward computer 101. In one embodiment of the invention, the first timestamp (like other timestamps discussed below) is a 64-bit integer. In one embodiment of the invention, the message is of sufficient size to store three 64-bit integer timestamps.

In block 204, the master node receives the message that the slave node sent in block 202. The master node inserts a second timestamp (called "master receive time") into the message, and immediately sends the message back toward the slave node from which the message was originally sent. The second timestamp specifies the time that is currently indicated by the local clock of the master node at the moment that the master node receives the message. Typically, the time that passes between the master node's receipt of the message and the master node's sending of the message back toward the slave node will be insignificant. For example, computer 101 (the master node) may receive the message previously sent by computer 102 (the slave node), timestamp the message as discussed above, and send the message back toward computer 102 over interconnects 195.

In block 206, the slave node receives the message that the master node sent back in block 204. The slave node inserts a third timestamp (called "slave receive time") into the message. The third timestamp specifies the time that is currently indicated by the local clock of the slave node at the moment that the slave node receives the message. For example, computer 102 (the slave node) may receive the message sent back by computer 101 (the master node) and timestamp the message as discussed above.

In block 208, the slave node computes a value, called "time delay," by subtracting "slave send time" (specified by the message's first timestamp) from "slave receive time" (specified by the message's third timestamp). The "time delay" value indicates how much time was required for the message to make a round-trip from the slave node to the master node and back again.

In block 210, the slave node computes a value, called "delta," by subtracting "slave send time" (specified by the message's first timestamp) from "master receive time" (specified by the message's second timestamp) to produce the difference, and then subtracting, from this difference, half of "time delay." Thus, in one embodiment of the invention, "delta"="master receive time"–"slave send time"–("time delay"/2). The "delta" value indicates the difference between the master node's local clock time and the slave node's local clock time. The "delta" value may be positive or negative, depending on whether the master node's clock is faster or slower than the slave node's local clock.

In block 212, the slave node determines whether the value of the "delta" determined in block 210 is greater than a specified threshold. For example, the specified threshold might be one millisecond. If the value of the "delta" is greater than the specified threshold, then control passes to block 214. Otherwise, control passes to block 216.

In block 214, no adjustment is made to the slave node's local clock. Under circumstances in which the absolute value of "delta" is sufficiently large, it is assumed that the latency of the network is too large a factor to predict, accurately, what the difference between the slave node's local clock and the master node's local clock is. The technique discussed above may be re-performed at a later time in order to attempt, again, to synchronize the slave node with the master node.

Alternatively, in block 216, the slave node determines whether the "delta" is positive or negative. If the "delta" is positive, then control passes to block 218. Alternatively, if the "delta" is negative, then control passes to block 220.

In block 218, the slave node adjusts its local clock by increasing the time indicated by its local clock by the "delta" value. For example, the slave node might invoke a UNIX system call such as "settimeofday( )" in order to set its local clock ahead to a specified time. The slave node is then considered to be synchronized with the master node. The technique discussed above may be re-performed periodically in order re-synchronize the slave node with the master node.

Alternatively, in block 220, the slave node slows down the rate at which its local clock advances. Significantly, in one embodiment of the invention, the slave node does not actually adjust its local clock backwards (e.g., by the "delta"), because doing so could produce the erroneous effect of the slave node having gone "back in time," which could have adverse consequences for the other nodes in the cluster. Therefore, in one embodiment of the invention, when the "delta" is negative (signifying that the slave node's local clock is running faster than the master node's local clock), then the slave node slows down the rate at which its local clock advances by some specified amount. The specified amount may be chosen such that after a specified interval of time has passed during which the slave node's clock has been running at the slower rate, the slave node's clock will become synchronized with the master node's clock.

The slave node's operating system may have a maximum limit by which the slave node's clock can be slowed down. In one embodiment of the invention, in response to a determination that a slave node is not synchronized with a master node, the frequency with which the slave node attempts to synchronize with the master node, as discussed above with reference to FIG. 2, is increased. Each time that the slave node's clock needs to be slowed down, it is slowed down by the maximum extent permitted by the slave node's operating system. For example, the slave node might invoke a UNIX system call such as "adjtime( )" in order to slow its clock down.

Voluntarily Relinquishing Mastership Due to Discrepancy

In one embodiment of the invention, the master node keeps track of the times indicated by the clocks of various nodes with which the master node exchanges messages in the manner described above. In one such embodiment of the invention, the master node periodically determines whether the times indicated by the clocks of other nodes are significantly different from the time indicated by the clock of the master node. In response to determining that the time indicated by the master node's clock is significantly different from the times indicated by the clocks of the other nodes, the master node concludes that the master node's own clock is the one that is probably too far out of sync, and, consequently, the master node voluntarily relinquishes its designation as the master node. The master node may inform (e.g., via a network broadcast message) the other nodes that it is no longer the master node. In response to receiving such information, the other nodes may go through an election process to designate another node to be the new master node.

In one embodiment of the invention, the master node concludes that its own clock is probably too far out of sync in response to determining that its clock's time is more than a specified threshold amount of time different from the times (e.g., an average of those times) indicated by at least two or more other nodes in the cluster. In another embodiment of the invention, the master node concludes that its own clock is probably too far out of sync in response to determining that its clock's time is more than a specified threshold amount of time different from the times indicated by at least a majority (e.g., more than half) of the other nodes in the cluster. In another embodiment of the invention, the master node concludes that its own clock is probably too far out of sync in response to determining that its clock's time is more than a specified threshold amount of time different from the times indicated by all of the other nodes in the cluster.

The process used to select or elect the new master node may be the same process that was previously used to select or elect the former master node. One technique for electing or selecting a master node is discussed in U.S. patent application Ser. No. 11/698,605. However, embodiments of the invention are not limited to any particular master node election technique.

Master Node Failure Recovery

It is possible that a node that has been designated as the master node might fail. For example, the master node's software or operating system might experience a terminal error, or the master node's hardware might lose electrical power. Under such circumstances, it may become necessary for a new master node to be selected for the cluster.

In one embodiment of the invention, if at least a specified threshold amount of time passes from the time that a slave node sends a message to the master node without that slave node receiving any response from the master node, then the slave node concludes that the master node has experienced some kind of failure. In response to making such a conclusion, the slave node informs the other nodes in the cluster that the existing master node has failed, and that a new master node needs to be elected. The other slave nodes in the cluster may responsively elect or select another node to be the new master node.

Additionally or alternatively, if a cluster membership service (an executing process which keeps track of the statuses of the nodes in the cluster) notices that the master node is no longer functioning, or has completely vanished from the cluster, then the cluster membership service may initiate the new master election process. The cluster membership service may notify the other nodes in the cluster that the existing master node is no longer functioning in that capacity, and that the remaining nodes in the cluster therefore need to elect another node to be the new master node.

In one embodiment of the invention, if the master node is capable of detecting that it will, in the near future, be unable to continue to function as the master node, then the master node informs the other nodes in the cluster that the master node is going to be unable to continue to function in that capacity. In response to receiving this information from the master node, the other nodes elect or select another node to be the new master node. For example, the master node may receive, from a user, a command to commence a shut-down process, which will cause the master node's hardware to turn off. In response to receiving such a command, but prior to turning off, the master node may send a broadcast network message to the other nodes in the cluster. The message may indicate that the master node is about to shut down, and that the other nodes need to elect a new master node for the cluster.

Synchronization as a Pre-Condition to Cluster Membership

In one embodiment of the invention, each node executes cluster membership software. In one embodiment of the invention, before a node is permitted to join a cluster formally, the cluster software on that node determines, using the message exchange with the master node described above, whether the time indicated by the node's clock is synchronized with the time indicated by the master node's clock. If the node's clock is not sufficiently synchronized (i.e., is more than a specified threshold amount of time different) with the master node's clock, then the cluster software on that node prevents the node from joining the cluster formally until the node's clock has become sufficiently synchronized with the master node's clock. Thus, nodes which have clocks that are too far out of sync can be kept from joining the cluster in the first place.

In one embodiment of the invention, if the cluster software determines that the node's clock is out of synchrony with the master node's clock, then the cluster software sends a message or alert to a system administrator. The message or alert may ask the system administrator to set the node's clock manually (e.g., using a user command) so that the node's clock is in synchrony with the master node's clock, for example.

Coexistence with Other Time Synchonization Mechanisms

According to one embodiment of the invention, one or more nodes of the cluster actively attempt to detect the presence of other time synchronization facilities in the cluster using a facility-specific mechanism. For example, in one embodiment of the invention, one or more nodes of the cluster actively attempt to detect the presence of a file named "ntp.conf," which indicates the coexistence of an NTP synchronization facility. In one embodiment of the invention, one or more nodes of the cluster additionally attempt to assess the "liveliness" of a coexisting time synchronization mechanism that has been detected in the cluster. In one embodiment of the invention, this detection is performed both at the time that cluster software (and/or cluster time synchronization software) is installed, and also at periodic intervals of time. In one embodiment of the invention, if a properly configured coexisting time synchronization mechanism is detected in the cluster, then the cluster time synchronization mechanism described herein (as managed by the master node) assumes an "observer" status. While the cluster time synchronization mechanism is in the "observer" status, one or more nodes monitors drifts and alerts produced by the coexisting time synchronization mechanism; however, while in the "observer" status, the nodes do not actively attempt to synchronize time using the master-slave time synchronization facility described herein. If the coexisting time synchronization mechanism (e.g., NTP) is found to be improperly configured at any time, then, in one embodiment of the invention, one or more nodes alert a user about this fact, so that the user can then either (a) fix the coexisting time synchronization mechanism or (b) remove the coexisting time synchronization mechanism so that the master-slave time synchronization facility becomes the only time synchronization mechanism in the cluster (at which time the remaining cluster time synchronization mechanism transitions out of "observer" status and into active status).

Contrast to Network Time Protocol

Network Time Protocol (NTP) is another mechanism for keeping track of time in a network. NTP is discussed in IETF RFC 1305. However, in NTP, the time synchronization source is configured (e.g., by a human being), unlike embodiments of the invention in which a master node is automatically elected from the cluster by other nodes in the cluster. The automatically elected master node acts as the time synchronization source for the cluster.

Additionally, NTP, by itself, provides no mechanism whereby a time-keeping authority can voluntarily relinquish its authoritative position, relative to nodes that rely upon it, in response to a self-determination that its own clock has become far out of sync with the clocks of the nodes that rely upon it. Furthermore, NTP, by itself, provides no mechanism whereby the clocks of surviving nodes in a cluster system can be continuously and seamlessly synchronized with each other even after and throughout the failure of a time-keeping authority upon which those surviving nodes had previously relied for time synchronization purposes. Also, NTP, by itself, provides no mechanism whereby nodes that are outside of the cluster, whose clocks are wildly out of synchrony with other nodes that are already members of the cluster, can be prevented from becoming members of the cluster. Additionally, NTP ignores whether other time synchronization mechanisms exist within a cluster. In contrast, embodiments of the invention gracefully handle the coexistence with other time synchronization mechanisms that might exist in the cluster.

Hardware Overview

Figure 3:
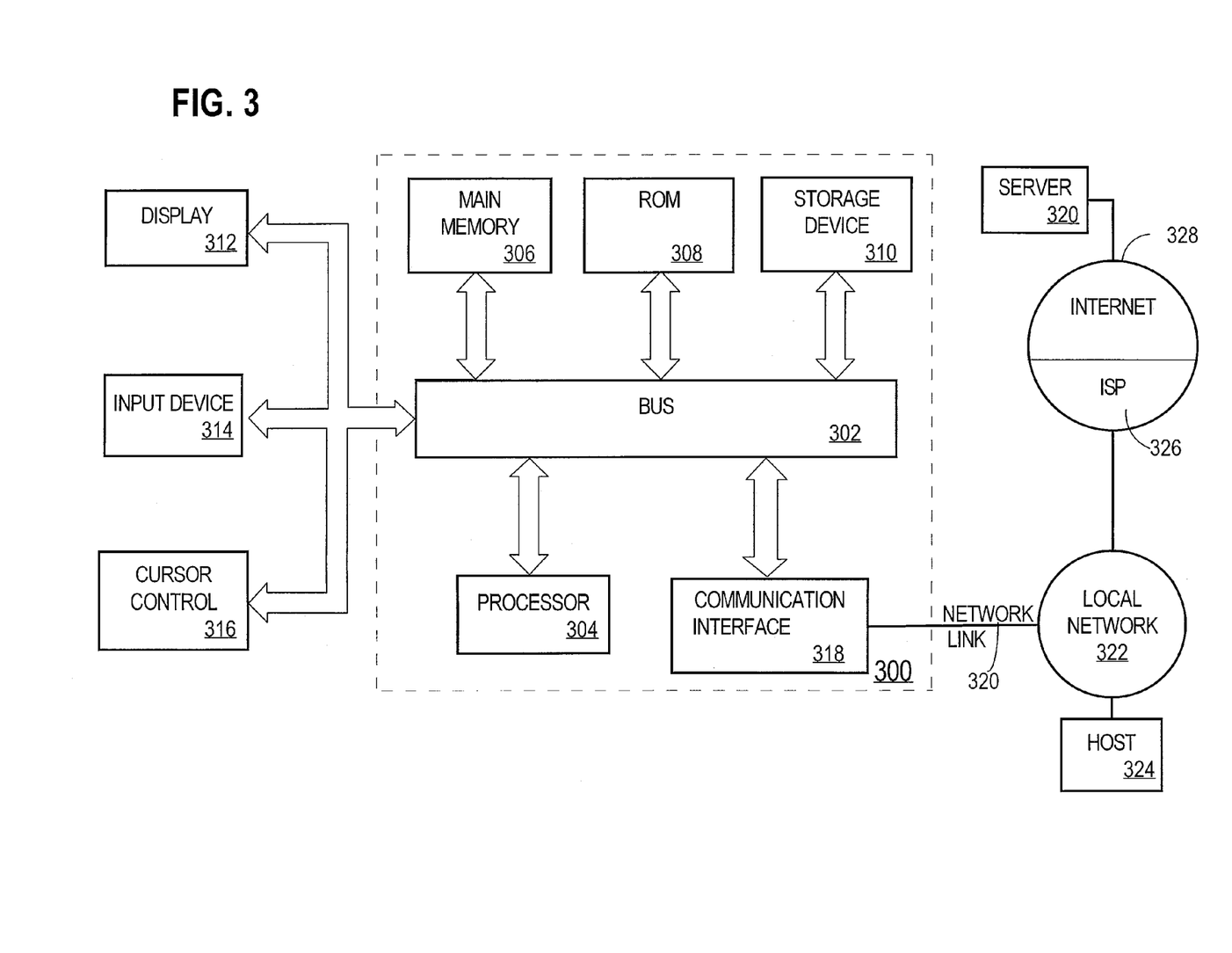
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The terms "machine-readable medium" and "computer-readable medium" as used herein refer to any medium that participates in providing data that causes a machine or computer, respectively, to operate in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. The terms "machine-readable storage medium" and "computer-readable storage medium" refer to volatile and non-volatile media upon which data can be stored. Transmission media includes coaxial cables, copper wire and fiber optics, including the wires that comprise bus 302. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use a transmitter to convert the data to a signal. A detector can receive the data carried in the signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   sending, toward a master node, a first message that indicates a first time at which the first message is sent toward the master node, as determined based on a local clock of a particular node that sends the first message;
   receiving, from the master node, a second message that indicates a second time at which the master node received the first message, as determined based on a master clock of the master node;
   based on at least the first time, the second time, and a third time at which the second message was received from the master node, as determined based on the local clock, adjusting a setting of the local clock to follow more closely a setting of the master clock.

2. The method as recited in claim 1, wherein the step of adjusting the setting of the local clock comprises:
   determining a time delay value by subtracting the first time from the third time;
   determining a delta value by subtracting the first time from the second time to produce a difference, and then subtracting half of the time delay value from the difference; and
   adjusting the setting of the local clock based on the delta value.

3. The method as recited in claim 2, wherein the step of adjusting the setting of the local clock comprises:
   determining whether the delta value is greater than a specified threshold; and
   in response to determining that the delta value is greater than the specified threshold, refraining from adjusting the setting of the local clock until further messages are exchanged with the master node.

4. The method as recited in claim 2, wherein the step of adjusting the setting of the local clock comprises:
   determining whether the delta value is greater than a specified threshold; and
   in response to determining that the delta value is not greater than the specified threshold, determining whether the delta value is positive; and
   in response to determining that the delta value is positive, adjusting the setting of the local clock by increasing the setting of the local clock by the delta value.

5. The method as recited in claim 2, wherein the step of adjusting the setting of the local clock comprises:

determining whether the delta value is greater than a specified threshold; and in response to determining that the delta value is not greater than the specified threshold, determining whether the delta value is negative; and in response to determining that the delta value is negative, adjusting the setting of the local clock by slowing down a rate at which the local clock advances.

6. The method as recited in claim 2, wherein the step of adjusting the setting of the local clock comprises:

determining whether the delta value is greater than a specified threshold; and in response to determining that the delta value is not greater than the specified threshold, determining whether the delta value is negative; and in response to determining that the delta value is negative, increasing a frequency with which time synchronization messages are exchanged with the master node.

7. The method as recited in claim 1, wherein the step of adjusting the setting of the local clock comprises:

adjusting the setting of the local clock by slowing down a rate at which the local clock advances by a maximum amount allowed by an operating system of the local node; and increasing a frequency with which the local node slows down the rate at which the local clock advances;

wherein the frequency is determined based on a number of times that the local clock will need to be slowed down by the maximum rate in order to cause the local clock to become synchronized with the master node within a specified amount of time.

8. The method as recited in claim 1, wherein the step of adjusting the setting of the local clock comprises:

adjusting the setting of the local clock without reference to any time source outside of a node cluster to which the local node and the master node belong.

9. The method as recited in claim 1, further comprising:

determining that the master node cannot continue to function in a master node role; and in response to determining that the master node cannot continue to function in the master node role, initiating a process by which another node in a node cluster to which the master node and the local node belong is selected to become a new master node for the cluster, with which all other nodes in the cluster will synchronize clocks of those other nodes.

10. The method as recited in claim 1, further comprising:

determining that the master clock is unsynchronized with a majority of clocks of other nodes in a node cluster to which the master node belongs; and in response to determining that the master clock is unsynchronized with a majority of clocks of other nodes in the cluster, initiating a process by which another node in the node cluster is selected to become a new master node for the cluster, with which all other nodes in the cluster will synchronize clocks of those other nodes.

11. The method as recited in claim 1, further comprising:

the master node voluntarily relinquishing the master node's status as master node; and in response to the master node voluntarily relinquishing the master node's status as master node, appointing another node in the cluster to become a new master node for a cluster to which the previous master node belongs.

12. The method as recited in claim 1, further comprising:

in response to an attempt, by a node that is not a member of a cluster to which the master node belongs, to become a member of the cluster, determining an extent to which a clock of the node that is not a member of the cluster is synchronized with the master clock; and in response to determining that the clock of the node that is not a member of the cluster is out of synchrony with the master clock by at least a specified amount, preventing the node that is not a member of the client from becoming a member of the cluster.

13. The method as recited in claim 1, further comprising:

determining whether an additional time synchronization facility is operational within a cluster to which the master node belongs;

in response to determining that said additional time synchronization facility is operational within said cluster, placing said master node into an observer status in which said master node does not attempt to synchronize times kept by any node in said cluster;

periodically determining whether said additional time synchronization facility is configured improperly;

in response to determining that said additional time synchronization facility is configured improperly, alerting a user that said additional time synchronization facility is configured improperly; and in response to a determination that said additional time synchronization facility has been removed, transitioning said master node out of said observer status into an active status in which said master node actively synchronizes times kept by other nodes in said cluster.

14. A volatile or non-volatile computer-readable storage medium on which are encoded instructions which, when executed by one or more processors, cause the one or more processors to perform steps comprising:

sending, toward a master node, a first message that indicates a first time at which the first message is sent toward the master node, as determined based on a local clock of a particular node that sends the first message;

receiving, from the master node, a second message that indicates a second time at which the master node received the first message, as determined based on a master clock of the master node;

based on at least the first time, the second time, and a third time at which the second message was received from the master node, as determined based on the local clock, adjusting a setting of the local clock to follow more closely a setting of the master clock.

15. The computer-readable medium as recited in claim 14, wherein the step of adjusting the setting of the local clock comprises:

determining a time delay value by subtracting the first time from the third time;

determining a delta value by subtracting the first time from the second time to produce a difference, and then subtracting half of the time delay value from the difference; and adjusting the setting of the local clock based on the delta value.

16. The computer-readable medium as recited in claim 15, wherein the step of adjusting the setting of the local clock comprises:

determining whether the delta value is greater than a specified threshold; and in response to determining that the delta value is greater than the specified threshold, refraining from adjusting the setting of the local clock until further messages are exchanged with the master node.

17. The computer-readable medium as recited in claim 15, wherein the step of adjusting the setting of the local clock comprises:

determining whether the delta value is greater than a specified threshold; and in response to determining that the delta value is not greater than the specified threshold, determining whether the delta value is positive; and in response to determining that the delta value is positive, adjusting the setting of the local clock by increasing the setting of the local clock by the delta value.

18. The computer-readable medium as recited in claim 15, wherein the step of adjusting the setting of the local clock comprises:

determining whether the delta value is greater than a specified threshold; and in response to determining that the delta value is not greater than the specified threshold, determining whether the delta value is negative; and in response to determining that the delta value is negative, adjusting the setting of the local clock by slowing down a rate at which the local clock advances.

19. The computer-readable medium as recited in claim 15, wherein the step of adjusting the setting of the local clock comprises:

determining whether the delta value is greater than a specified threshold; and in response to determining that the delta value is not greater than the specified threshold, determining whether the delta value is negative; and in response to determining that the delta value is negative, increasing a frequency with which time synchronization messages are exchanged with the master node.

20. The computer-readable medium as recited in claim 15, wherein the step of adjusting the setting of the local clock comprises:

adjusting the setting of the local clock by slowing down a rate at which the local clock advances by a maximum amount allowed by an operating system of the local node; and increasing a frequency with which the local node slows down the rate at which the local clock advances;

wherein the frequency is determined based on a number of times that the local clock will need to be slowed down by the maximum rate in order to cause the local clock to become synchronized with the master node within a specified amount of time.

21. The computer-readable medium as recited in claim 14, wherein the step of adjusting the setting of the local clock comprises:

adjusting the setting of the local clock without reference to any time source outside of a node cluster to which the local node and the master node belong.

22. The computer-readable medium as recited in claim 14, wherein the steps further comprise:

determining that the master node cannot continue to function in a master node role; and in response to determining that the master node cannot continue to function in the master node role, initiating a process by which another node in a node cluster to which the master node and the local node belong is selected to become a new master node for the cluster, with which all other nodes in the cluster will synchronize clocks of those other nodes.

23. The computer-readable medium as recited in claim 14, wherein the steps further comprise:

determining that the master clock is unsynchronized with a majority of clocks of other nodes in a node cluster to which the master node belongs; and in response to determining that the master clock is unsynchronized with a majority of clocks of other nodes in the cluster, initiating a process by which another node in the node cluster is selected to become a new master node for the cluster, with which all other nodes in the cluster will synchronize clocks of those other nodes.

24. The computer-readable medium as recited in claim 14, wherein the steps further comprise:

the master node voluntarily relinquishing the master node's status as master node; and in response to the master node voluntarily relinquishing the master node's status as master node, appointing another node in the cluster to become a new master node for a cluster to which the previous master node belongs.

25. The computer-readable medium as recited in claim 14, wherein the steps further comprise:

in response to an attempt, by a node that is not a member of a cluster to which the master node belongs, to become a member of the cluster, determining an extent to which a clock of the node that is not a member of the cluster is synchronized with the master clock; and in response to determining that the clock of the node that is not a member of the cluster is out of synchrony with the master clock by at least a specified amount, preventing the node that is not a member of the client from becoming a member of the cluster.

26. The computer-readable medium as recited in claim 14, wherein the steps further comprise:

determining whether an additional time synchronization facility is operational within a cluster to which the master node belongs;

in response to determining that said additional time synchronization facility is operational within said cluster, placing said master node into an observer status in which said master node does not attempt to synchronize times kept by any node in said cluster;

periodically determining whether said additional time synchronization facility is configured improperly;

in response to determining that said additional time synchronization facility is configured improperly, alerting a user that said additional time synchronization facility is configured improperly; and in response to a determination that said additional time synchronization facility has been removed, transitioning said master node out of said observer status into an active status in which said master node actively synchronizes times kept by other nodes in said cluster.

* * * * *

UNITED STATES PATENT AND TRADEMARK OFFICE
CERTIFICATE OF CORRECTION

PATENT NO. : 8,169,856 B2
APPLICATION NO. : 12/258344
DATED : May 1, 2012
INVENTOR(S) : Rai et al.

It is certified that error appears in the above-identified patent and that said Letters Patent is hereby corrected as shown below:

In column 7, line 14, delete "Synchonization" and insert -- Synchronization --, therefor.

Signed and Sealed this
Thirty-first Day of July, 2012

David J. Kappos
*Director of the United States Patent and Trademark Office*